United States Patent
Schönenborn et al.

(10) Patent No.: US 12,292,409 B2
(45) Date of Patent: May 6, 2025

(54) METHOD AND APPARATUS FOR DETERMINING MECHANICAL PARAMETERS BY MEANS OF MECHANICAL EXCITATIONS

(71) Applicant: MTU Aero Engines AG, Munich (DE)

(72) Inventors: Harald Schönenborn, Munich (DE);
Lukas Kohlmann, Munich (DE);
Stefan Schwarz, Munich (DE); Malte Krack, Stuttgart (DE); Benjamin Seeger, Stuttgart (DE)

(73) Assignee: MTU Aero Engines AG, Munich (DE)

( * ) Notice: Subject to any disclaimer, the term of this patent is extended or adjusted under 35 U.S.C. 154(b) by 343 days.

(21) Appl. No.: 17/779,316

(22) PCT Filed: Dec. 1, 2020

(86) PCT No.: PCT/DE2020/000297
§ 371 (c)(1),
(2) Date: Nov. 14, 2022

(87) PCT Pub. No.: WO2021/110190
PCT Pub. Date: Jun. 10, 2021

(65) Prior Publication Data
US 2023/0213485 A1 Jul. 6, 2023

(30) Foreign Application Priority Data
Dec. 3, 2019 (DE) .......................... 102019218809.5

(51) Int. Cl.
*G01N 29/12* (2006.01)
*F01D 5/34* (2006.01)
(Continued)

(52) U.S. Cl.
CPC ............... *G01N 29/12* (2013.01); *F01D 5/34* (2013.01); *G01H 9/00* (2013.01); *G01M 5/0016* (2013.01);
(Continued)

(58) Field of Classification Search
CPC ............. G01N 29/12; G01N 2291/014; G01N 2291/0234; G01N 29/045; G01N 29/2418;
(Continued)

(56) References Cited

U.S. PATENT DOCUMENTS

| | | | | |
|---|---|---|---|---|
| 6,629,463 B2 * | 10/2003 | Naudet | ................... | G01N 29/46 73/598 |
| 7,383,136 B1 * | 6/2008 | Griffin | ................... | G01H 1/006 702/56 |

(Continued)

FOREIGN PATENT DOCUMENTS

| | | |
|---|---|---|
| CN | 103217213 A | 7/2013 |
| DE | 102009010375 | 9/2010 |

(Continued)

OTHER PUBLICATIONS

Valentin, D., Valero, C., Egusquiza, M., & Egusquiza, E. (2019). Experimental measurements of the natural frequencies and mode shapes of rotating disk-blades-disk assemblies from the stationary frame. Applied Sciences, 9(18), 3864. doi:https://doi.org/10.3390/app9183864 (Year: 2019).*

(Continued)

*Primary Examiner* — Alvaro E Fortich
*Assistant Examiner* — Martin Walter Braunlich
(74) *Attorney, Agent, or Firm* — Davidson Kappel LLC

(57) ABSTRACT

A method is provided including the steps: —first excitation of the object via a multifrequency signal; —detecting a first response signal of the object at one or multiple measuring
(Continued)

points at the object; —transforming the first response signal from a time range into a frequency-dependent range; —selecting one or multiple frequencies, based on the frequency-dependent range; —second excitation of the object based on the selected frequencies; —detecting a second response signal of the object at one or multiple measuring points of the object; —ascertaining a mechanical parameter based on the second response signal.

14 Claims, 2 Drawing Sheets

(51) Int. Cl.
    *G01H 9/00*     (2006.01)
    *G01M 5/00*     (2006.01)
    *G01M 13/00*     (2019.01)
    *G01M 15/14*     (2006.01)

(52) U.S. Cl.
    CPC .......... *G01M 5/0066* (2013.01); *G01M 13/00* (2013.01); *G01M 15/14* (2013.01); *F05D 2260/83* (2013.01); *G01N 2291/014* (2013.01)

(58) Field of Classification Search
    CPC .. G01N 29/348; G01N 29/44; G01N 29/4418; G01N 29/4472; G01N 2291/0258; G01N 2291/103; G01N 2291/102; F01D 5/34; F01D 25/04; F01D 25/06; G01H 9/00; G01H 13/00; G01H 1/006; G01H 7/00; G01H 9/002; G01H 9/008; G01H 17/00; G01M 5/0016; G01M 5/0066; G01M 13/00; G01M 15/14; G01M 1/22; G01M 7/025; F05D 2260/83

See application file for complete search history.

(56) References Cited

U.S. PATENT DOCUMENTS

| | | | | |
|---|---|---|---|---|
| 8,024,137 | B2* | 9/2011 | Kuehhorn | ................ G01H 9/00 |
| | | | | 702/56 |
| 9,739,167 | B2* | 8/2017 | Heinig | .................. F01D 21/045 |
| 10,775,269 | B2* | 9/2020 | Gysling | ................. G01M 15/14 |
| 2004/0243310 | A1 | 12/2004 | Griffin et al. | |
| 2019/0234908 | A1 | 8/2019 | Meile et al. | |

FOREIGN PATENT DOCUMENTS

| | | |
|---|---|---|
| DE | 102018206581 A1 | 10/2019 |
| EP | 1950869 A1 | 7/2008 |
| EP | 3521781 A1 | 8/2019 |
| WO | WO 2010/097074 A2 | 9/2010 |
| WO | WO2012177659 A2 | 12/2012 |

OTHER PUBLICATIONS

Joo-Ho, J., Kyung-Tae, K., & Sang-Hong, P. (2013). Removal of JEM signal by accurate estimation of initial parameters of chirplet basis functions. Progress in Electromagnetics Research, 141, 607-618. doi:https://doi.org/10.2528/PIER13062408 (Year: 2013).*
ISR of PCT/DE2020/000297 dated Mar. 30, 2021.

* cited by examiner

METHOD AND APPARATUS FOR DETERMINING MECHANICAL PARAMETERS BY MEANS OF MECHANICAL EXCITATIONS

TECHNICAL FIELD

Specific embodiments are described below which relate to a method and a device for ascertaining at least one mechanical parameter of a mechanical object, for example a stiffness or an oscillation behavior of an integrally manufactured blade wheel.

BACKGROUND

The measurement of mechanical objects, for example compressor wheels and/or turbine wheels for turbomachines, may traditionally take place by applying an excitation to the object, which triggers a mechanical response of the object that may be metrologically detected as a time-dependent signal. For determining the mechanical properties of the object, for example its mass, damping, and/or natural frequencies and oscillation modes, the time signal may be converted into the frequency range and a corresponding transfer function may thus be set up, which as a model then in turn allows information about the mechanical object properties and which may be simulated. A measuring device for such a method is described in DE 102009010375 A1.

Blade wheels, for example compressor wheels and/or turbine wheels for turbomachines, have previously been manufactured from a wheel disk and specially fabricated airfoils. The blade wheels have been connected to a wheel hub in a form-fit manner, in particular via a dovetail joint. Recently, blade wheels have also been integrally manufactured. Integral blade wheels (also referred to as "blade integrated disks" or "blisks") have a one-part construction. The form-fit connection between the wheel hub and the blades is dispensed with, for example by milling the blades and the hub out of a single blank. In contrast to nonintegrally manufactured blade wheels, blisks generally have lower damping which is therefore more difficult to determine, since no energy dissipation due to friction can take place at the form-fit contact surfaces between the blades and the wheel hub.

As the result of differences between the individual blades, resonance passages look different for each blade. This property is also referred to as "mistuning." The mistuning of blade wheels may be due to the manufacture, caused, for example, by tool wear during the milling of the blades. Material inhomogeneities are also conceivable reasons for a mistuning. In terms of system dynamics, a mistuning may be defined in that the natural frequencies of the individual blades differ from one another.

In addition to these inhomogeneities, blade wheels have numerous different natural oscillation forms (modes) that may be excited into oscillations during operation, depending on the structural design and the interaction of the components of the blade wheels.

In general, natural frequencies and natural oscillation forms of a blade wheel may also change as a function of the rotational speed, the aerodynamic pressure, and/or the temperature of a mechanical object, in particular a blade wheel. For example, the natural frequencies of the blades typically increase with increasing rotational speed of the blade wheel. Such a system is thus time-variant during operation.

SUMMARY OF THE INVENTION

The measurement of blade wheels using purely frequency-based methods, mentioned at the outset, may lead to unsatisfactory results. In particular, in order to achieve the required low failure rates of these objects, a precise determination of the mechanical parameters is necessary, in particular to minimize vibrations that cause material fatigue.

This results in the problem, to accurately measure and determine mechanical parameters of a mechanical object, in particular to determine damping and stiffness of a blade wheel as well as a position and amplitude of resonance frequencies that are excitable at a blade wheel.

The present invention provides a method (600) for ascertaining at least one mechanical parameter ($\delta\lambda$, $\xi\_m\_B$, $\xi\_m\_S$, $\delta\xi\_B$, $f\_B$) of a mechanical object, including the steps:

first excitation of the object via a multifrequency signal (101);
detecting a first response signal of the object at one or multiple measuring points at the object;
transforming the first response signal from a time range into a frequency-dependent range (300);
selecting one or multiple frequencies (303), based on the frequency-dependent range;
second excitation of the object based on the selected frequencies (303);
detecting a second response signal of the object at one or multiple measuring points of the object;
ascertaining a mechanical parameter ($\delta\lambda$, $\xi\_m\_B$, $\xi\_m\_S$, $\delta\xi\_B$, $f\_B$) based on the second response signal.

Some specific embodiments solve the problem that the blades of a blisk have been manufactured with unknown mistuning, and that it is thus unclear which resonances the blisk has that are to be avoided during operation. For this purpose, the blades are supported in a resting position of the blisk, and in a first measuring stage are excited by an acoustic sweep signal. The measurement of the system response takes place at selected measuring points at the blades of the blisk and via laser vibrometry. Based on the information thus obtained, certain frequencies are selected which in a second measuring stage are acoustically excited via a sinusoidal signal. Based on the recorded amplitude responses and phase responses, the mechanical parameters of damping and/or stiffness of the various blades and/or likewise the forces generated on the blades by the acoustic signal are identified based on a model.

A first aspect relates to a method, including the steps mentioned above.

A mechanical parameter may in particular be a damping. Additionally or alternatively, a mechanical parameter may be a stiffness. Additionally or alternatively, a mechanical parameter may be a natural frequency, an oscillation mode, in particular a parameter of an oscillation mode, for example a node circumference or a node diameter. Additionally or alternatively, a mechanical parameter may also represent a resonance frequency at which the object oscillates or vibrates more intensely when it is thus excited. A mechanical parameter may include one or multiple individual mechanical parameters of those described above. In particular, a mechanical parameter may include multiple mechanical parameters of the same type which relate to various locations of the mechanical object; for example, a mechanical parameter may include stiffnesses of various blades of a blade wheel and/or stiffnesses for different operating parameters. A mechanical parameter may be present as a scalar, as a vector, or as a tensor.

A mechanical object may in particular be a disk or a disk-shaped object, which in particular may be mistuned. In particular, a mechanical object may be made of a metal or a plastic. In particular, a mechanical object may include a metal or a plastic. A mechanical object may in particular be part of a turbomachine or of a turbocharger. In particular, a mechanical object may be a blade wheel or may include a blade wheel, and in particular may be a blade wheel of a compressor stage or turbo stage of a turbomachine. In particular, a mechanical object may be a propeller or an impeller. However, a mechanical object may also be a musical instrument, in particular a percussion instrument, for example a tom-tom drum or a hi-hat.

A multifrequency excitation signal may in particular be a Dirac pulse or a step pulse, it being necessary to take into account that a mechanical implementation of such a multifrequency signal results in a low pass-filtered Dirac pulse or a low pass-filtered step pulse. Alternatively, a multifrequency excitation signal may also be implemented by a sweep signal or a chirp signal. In another alternative, a multifrequency signal may be implemented via white noise or via pink noise. In another alternative, a specially formed excitation signal may be used which, for example, is defined in a frequency range. Except for a stepped signal, these input signals have the disadvantage that the excited mechanical object may possibly not satisfactorily reach a steady state with respect to these input signals. Thus, the measuring results for such input signals will not reflect a static state of the mechanical system. In particular, a multifrequency excitation signal may be configured to the greatest node diameter of the mechanical object, so that it in particular excites this natural oscillation.

The detection of a first response signal of the object at one or multiple measuring points at the object may in particular be preceded by a determination of the measuring points in question. In particular, a finite element model of the mechanical object may be assumed. For example, a finite element model of a blade wheel or of a blade may be created. By simulating the finite element model or by appropriately simulating the mechanical object, mechanical parameters of the object may be predetermined to a certain extent. For example, it may be identified in which ranges a damping or a stiffness of the mechanical object may vary. Additionally or alternatively, it may be established in which range the mechanical object has natural oscillations, and/or which and/or how many natural oscillation modes the mechanical object has. In particular, the proper motion modes of a blade of a blade wheel may be determined by simulation.

Based on the simulation results, measuring points may be distributed at the mechanical object. In particular, measuring points may be situated at an exposed tip of the mechanical object, for example at a corner or at an end of a blade of a blade wheel. This is because oscillations of most of the natural oscillation modes of the object have an effect at exposed ends of a mechanical object. In particular, one or multiple measuring points may be situated at the mechanical objects in such a way that they satisfy an optimization criterion, in particular so that a piece of information that is obtained by the measurement is optimized. For example, such an optimization may be based on a maximum of the Fisher information. Additionally or alternatively, the measuring points may be distributed in such a way that linearly independent information for various modes may be observed. Accordingly, the number of measuring points may be a function of the number of natural oscillation modes ascertained in the simulation. For example, for seven ascertained natural oscillation modes, seven measuring points may be situated on the mechanical object. A measurement may in particular take place using a laser, for example a laser Doppler vibrometer. Additionally or alternatively, a measurement may take place using strain gauges that are situated at the corresponding measuring points at the mechanical object. Additionally or alternatively, a measurement may take place in a contactless manner via imaging methods, for example using a camera that observes the measuring points. Accordingly, the measuring points must also be situated in such a way that they may be observed by the sensor used.

One specific embodiment of the first aspect relates to a method, the object being an in particular integrally manufactured blade wheel or one or multiple blades of a blade wheel.

Such a blade wheel may in particular be an integrally manufactured blade wheel. Integrally manufactured blade wheels are also referred to as "blade integrated disks" or "blisks" for short. Mechanical parameters of a blade wheel may in particular relate to disk oscillations and/or blade oscillations and/or oscillations that are generated by a coupling between blades and disks. In particular, a mechanical parameter may also relate to a mode configuration made up of linearly and circularly arranged nodes of a blade wheel. Nodes are those points which are at rest during an oscillation of a blade or a blade wheel. Mechanical parameters may in particular be time-variant. This may be the case, for example, for blade wheels whose stiffness increases with increasing rotational speed, and which are thus a function of a rotational speed, and thus correspondingly a function of a time period. A mechanical parameter may additionally relate to a mistuning of a mechanical object, in particular a blade wheel. A mistuning is defined by different natural frequencies of the blades of a blade wheel. Blade wheels are generally mistuned, since only in the ideal case is a blade wheel completely cyclic or symmetrical. Such a mistuning may be caused in particular by manufacturing-specific time variances, for example due to tool wear during milling of an integrated blade wheel, or a change of tools, or manual finishing. These are only a few of the possible reasons for differences in the blades of a blade wheel. Accordingly, a mechanical parameter may in particular relate to a standard deviation of the blade natural frequencies. Additionally or alternatively, a mechanical parameter may relate to one or multiple absolute differences between various blades of a blade wheel. If the blade natural frequencies differ from one another, locally limited oscillation amplitudes result, for example over a circumference of a blade wheel. These differences result in additional Fourier coefficients in the spectrum of the individual blades. In addition, these additional coefficients or the different spectra of different blades may form the basis for a mechanical parameter. Accordingly, a mechanical parameter may also relate to a mode fullness of a blade wheel. Additionally or alternatively, a mechanical parameter may relate to a degree of localization which, for example, sets the ratio of the largest blade amplitude to the root mean square of all blade amplitudes of a blade wheel. By use of this mechanical parameter, different blade wheels may be compared with regard to their mistuning.

One specific embodiment of the first aspect relates to a method, the first excitation taking place using an acoustic signal.

A first excitation using a multifrequency signal may in particular take place via an acoustic excitation. Additionally or alternatively, a first excitation may take place using a mechanical unit, for example a modal hammer, via which, for example, a blade of a quiescently supported airfoil is excited. Additionally or alternatively, a mechanical excitation may take place via a rotation of the mechanical object, in particular a rotation of a blade wheel. In this case, an excitation may take place via aerodynamic effects, in particular via swirls by the blade wheels when they move in a fluid, in particular a gas such as air.

One specific embodiment of the first aspect relates to a method, the multifrequency signal being a sweep signal or a chirp signal.

For a sweep signal or chirp signal, a signal length may in particular be ten seconds, and a change in the corresponding pulse may be 1 kHz/s, so that a corresponding bandwidth at frequencies for each excitation signal may be mapped.

A sweep pulse and/or chirp pulse may also be selected in such a way that it is based on a large node diameter, in particular the largest node diameter, and excites same. This may be achieved in particular by appropriate parameterization of the phase position of the pulse. The large node diameters for a blade wheel advantageously often have low coupling between the disk and the blades of the blade wheel, so that detection of a mechanical parameter of a blade may be improved, and in particular a mistuning may be better detected.

One specific embodiment of the first aspect relates to a method, the length of the sweep signal or of the chirp signal being shorter than a mechanical settling time of the object.

In particular, the length of the sweep signal or of the chirp signal may be 10 ms, and/or a frequency interval may encompass up to 10 kHz. Additionally or alternatively, a duration of a sweep pulse may be a function of a node diameter family to be detected, or as a function of the number of node diameter families to be detected. In particular, a duration may be between 0.5 s and 3 s for each node diameter family.

One specific embodiment of the first aspect relates to a method, the frequency-dependent range into which the first response signal is transformed being a function of time, rotational speed, and/or position.

The transformation of the first output signal from a time range into a frequency-dependent range may in particular include a local or temporal resolution. For example, a transformation of the first output signal may take place via a short Fourier transform into a spectrogram. Additionally or alternatively, a transformation may take place via a wavelet transformation or via a chirplet transformation. In particular, time-variant or position-variant aspects of the mechanical parameter of the mechanical object may be advantageously detected in this way.

One specific embodiment of the first aspect relates to a method, the transformation of the first response signal being carried out via a wavelet transformation or via a chirplet transformation. This advantageously results in these transformations being evaluated along a relationship between time and excitation frequency.

A wavelet transformation may take place in particular based on a continuous wavelet transformation. Alternatively, a wavelet transformation may take place based on a discrete wavelet transformation. In particular a Morlet wavelet, a Haar wavelet, a Meyer wavelet, or a Daubechies wavelet may be used as wavelets. In particular for a blade wheel, a wavelet transformation may be carried out for different blades in each case.

One specific embodiment of the first aspect relates to a method, the selection of one or multiple frequencies based on the frequency-dependent range maximizing a piece of information concerning an amplitude pattern or phase pattern over the frequency-dependent range.

The selection of one or multiple frequencies based on the frequency-dependent range may in particular include multiple supporting points in a frequency-dependent range of the mechanical object or a portion of the mechanical object, in particular a blade of a blade wheel. Additionally or alternatively, the supporting points may be provided for different times, in which the time-dependent range is resolved, for one or multiple parts of the mechanical object, in particular for one or multiple blades of a blade wheel. In particular, the number of supporting points may be selected in such a way that an equation system to be subsequently used is determined or overdetermined for ascertaining the mechanical parameter. In particular, the supporting points may be situated in a frequency-dependent range in such a way that they detect as much information as possible concerning this frequency pattern. In particular, supporting points where a first derivative or a second derivative of the frequency-dependent pattern is high or at a maximum may be selected. Additionally or alternatively, supporting points where the frequency-dependent pattern has maximum values may be selected. In particular a resonance characteristic of the mechanical object, in particular a resonance characteristic of a blade of a blade wheel, may be detected in this way.

One specific embodiment of the first aspect relates to a method, multiple frequencies being selected in such a way that an equation system is determined or overdetermined with regard to the mechanical parameter.

After a second response signal of the object is detected at one or multiple measuring points of the object, it being possible for these measuring points to differ in particular from the measuring points when detecting the first response signal of the object, in particular a selection of the obtained information may take place. In particular, the selection may take place with regard to certain regions of the mechanical object. If the mechanical object is a blade wheel or a blade of a blade wheel, a veering region or a crossing region, for example, may be selected as regions. Additionally or alternatively, the results may be selected with regard to certain frequencies, in particular since oscillation characteristics of the analyzed mechanical object of interest may be observed in these certain frequencies. In particular, frequencies may be selected in which node diameter families of interest appear. For example, a node diameter family that appears in particular with a high frequency, and also a node diameter family that appears in particular with a low frequency, may be selected.

One specific embodiment of the first aspect relates to a method, the second excitation of the object taking place based on one or multiple sinusoidal excitation signals.

In particular, due to the fact that the quality of the previous evaluations may be even further improved, the second excitation of the object is carried out based on the supporting points that are formed. The second excitation may in particular take place similarly to the first excitation, and in particular also using a sweep signal or a chirp signal. Alternatively, the second excitation may take place in particular via a sinusoidal oscillation, for example via a sine oscillation or a cosine oscillation. This results in the advantage that the system may oscillate to the excitation, so that an oscillating behavior of the mechanical object may be observed as a response of the mechanical object to the second excitation. The previously ascertained results may be better analyzed with higher resolution via the measurements at the selected frequencies of the analysis carried out based on the first excitation.

One specific embodiment of the first aspect relates to a method, the ascertainment of the mechanical parameter including selecting the second response signals, on the basis of which the mechanical parameter is ascertained.

The ascertainment of a mechanical parameter from the second response signal may take place in particular by adapting the parameters of an in particular dynamic model. For example, the parameters of damping and stiffness from a corresponding motion equation may be adapted for the blade of a blisk in such a way that the response of the motion equation during an excitation that is equal to the second excitation provides the same system response, or at least a system response whose differences from the measuring result have been minimized. Of course, the motion equation may also be adapted as a function of various rotational speeds. Additionally or alternatively, the excitation force acting on a blade may be computed, in particular when mechanical parameters that have been identified at one blade are transferred to another blade, and on this basis the motion equation is correspondingly solved.

The ascertainment of the mechanical parameter may also be carried out by a so-called reduced-order model. In particular, the model may include in the computation additional operating conditions, for example a temperature prevailing during operation, aerodynamic conditions prevailing during operation, and/or forces prevailing during operation, in particular centrifugal forces. The accuracy of the obtained mechanical parameter may be further increased in this way.

A second aspect of the present invention relates to a device that is configured to:
carry out a first excitation of the object using a multifrequency signal;
detect a first response signal of the object at one or multiple measuring points at the object;
transform the first response signal from a time range into a frequency-dependent range;
carry out a second excitation of the object based on selected frequencies;
detect a second response signal of the object at one or multiple measuring points of the object;
ascertain the mechanical parameter based on the second response signal.

The device may also include further structures and functions for allowing the method steps, described above within the scope of the first aspect, to be implemented.

One specific embodiment of the second aspect relates to a device, the mechanical object being supported by one or multiple springs having a predefined stiffness.

The suspension may take place in particular via springs on which the mechanical object is suspended. Additionally or alternatively, the suspension may take place in such a way that the mechanical object is at least partially supported by the suspension. The stiffness resulting from the one or multiple springs may in particular be less than a stiffness of the mechanical object. In particular, the difference between the stiffness of the suspension and the stiffness of the mechanical object may be great enough that the mechanical object is supported virtually in a floating manner, so that in particular coupling effects between the device and the mechanical object that is to be measured are avoided.

One specific embodiment of the second aspect relates to a device, the first excitation and/or the second excitation taking place via a plurality of speakers, each of which excites a portion of the mechanical object, in particular one of multiple blades of a blade wheel, and a calibration of a sound level and of a phase taking place in succession for one or multiple speakers.

In particular, the excitation may be in phase and/or may take place with a predefined phase shift between the individual speakers.

BRIEF DESCRIPTION OF THE DRAWINGS

Further advantages and features result from the following specific embodiments, which refer to the figures. The figures do not always show the specific embodiments true to scale. The dimensions of the various features may in particular be appropriately enlarged or reduced for clarity of the description. Some of the figures are shown in a schematic fashion.

DETAILED DESCRIPTION

Figure 1:
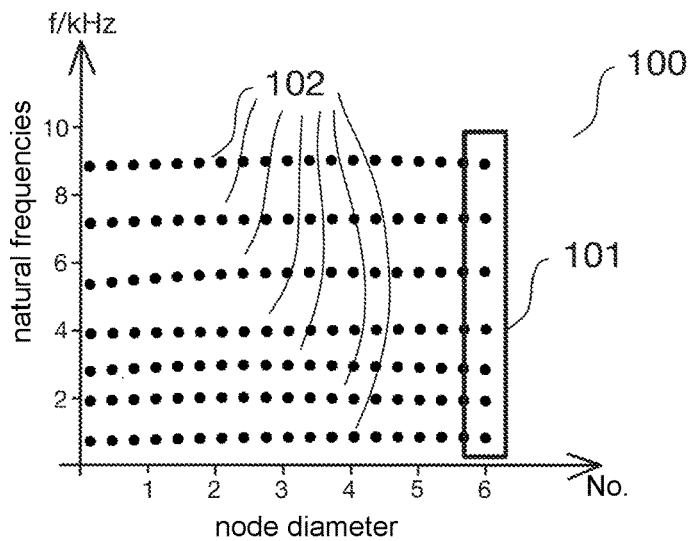
FIG. 1 shows a coupling diagram.

In the following descriptions, identical or at least functionally equivalent features are denoted by the same reference numerals.

In the following detailed description, reference is made to the appended drawings, which constitute part of this description and which show specific aspects for purposes of illustration, and via which the present disclosure may be understood. It is understood that other aspects and/or features may be used, and that functional, structural, or logical changes are possible, without departing from the scope of the present disclosure. The following detailed description is therefore not to be construed in a limiting sense, since the scope of the present invention is defined by the appended claims.

In general, an explanation of a described method also applies to a corresponding device for carrying out the method, or a corresponding system that includes one or multiple devices, and vice versa. If, for example, a particular method step is described, a corresponding device may have a feature for carrying out the described method step, even if this feature is not explicitly described or illustrated in the figure. On the other hand, if, for example, a particular device is described on the basis of functional units, a corresponding method may include a step that carries out the described functionality, even if such steps are not explicitly described or illustrated in the figures. Likewise, a system may be provided with corresponding device features or with features for carrying out a certain method step. It is understood that features of the various aspects and specific embodiments described above or explained below by way of example may be combined with one another unless expressly stated otherwise.

FIG. 1 relates to a first excitation of a mechanical object. In this case, the mechanical object is an integrally manufactured blade wheel. The coupling diagram may be utilized for better illustration of the complex oscillation behavior of a blade wheel. The natural frequencies of the blade wheel are plotted as a function of the associated number of node diameter lines. FIG. 1 shows such a coupling diagram 100, and also various node diameter families 102, each of which is characterized by similar natural frequencies. The nonintegral node diameters illustrated in FIG. 1 are interpolations that are used solely to clarify the position of a node diameter family. The natural frequencies under consideration range from 0 kHz to 10 kHz. A total of seven node diameter families are illustrated. A first node diameter family oscillates already below 1 kHz. A second node diameter family oscillates at approximately 2 kHz. Further node diameter families oscillate at natural frequencies between 2 kHz and 8 kHz. A topmost node diameter family oscillates at approximately 9 kHz. The integrally manufactured blade wheel disk under consideration is excited, using the method, for detecting at least one mechanical parameter via a first multifrequency signal. This excitation takes place in that the blade wheel disk is stably supported at rest. Situated beneath each blade of the blade wheel disk is a speaker, as an acoustic actuator, which may emit the multifrequency signal in such a way that it impinges in the same manner on each blade of the blade wheel disk, and shifts it into a first excitation. To emulate a rotation of the blade wheel disk, the speakers are activated via a corresponding phase shift, so that each speaker provides for its blade a corresponding excitation that is phase-shifted, and the corresponding blades are thus likewise excited with phase shifting. The phase-shifted activation is produced by an appropriate control unit which also generates the multifrequency signal. To avoid undesirable coupling effects between the blades or the blade wheel disk and the device for detecting the at least one mechanical parameter of the blade wheel disk, the blade wheel disk is supported by the device on three springs. The springs are designed as coil springs and are situated beneath the blade wheel disk, so that the blade wheel disk is supported with its weight on the three springs. The springs have the same stiffness, which is significantly less than the stiffness of the blade wheel disk, or the stiffness that is expected from the blade wheel disk and its blades. The blade wheel disk is set into oscillations via its blades by the first excitation, using a multifrequency signal $101$. In this case, multifrequency signal $101$ represents a sweep pulse. The sweep pulse is generated from $3.84*10^6$ supporting points in the time range. The sweep signal passes through frequencies which from the lowest frequency to the highest frequency encompass a bandwidth of 10 kHz. Alternatively, the method has also been implemented using an excitation signal at 22 s and at a clock rate of 375 kHz clock pulse, using 80 speakers for all blades of a blade wheel. In contrast to the method provided in DE 102009010375 A1, the excitation is implemented not only at individual frequencies, but also with a continuous consecutive series of multiple frequencies as a continuous frequency transit. In addition, the phase activation is no longer achieved using a delay device, but, rather, using a signal output device on which the phase-shifted and calibrated signals are statically stored. The calibration takes place in succession for the sound level and the phase. Furthermore, instead of a single measuring stage, the provided method includes two stages with a first excitation and a second excitation for increasing the accuracy of the detected mechanical parameter.

Figure 2:
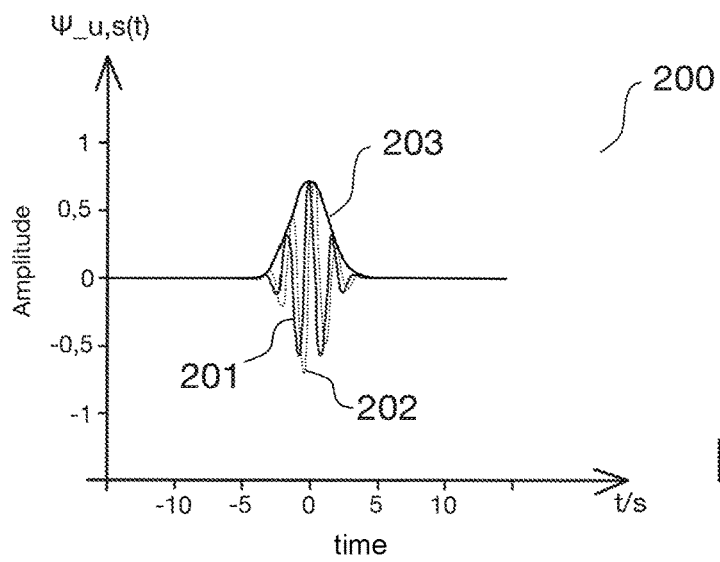
FIG. 2 shows a signal representation of a wavelet.

FIG. 2 shows a signal pattern 200 of a Mutter wavelet, with the aid of which one or multiple response signals, resulting from the first excitation using a sweep signal, are transformed into a frequency- and time-dependent range. In this case, the Mutter wavelet represents a Morlet wavelet. A wavelet transformation is carried out using same. The Morlet-Mutter wavelet includes a real portion 201 and an imaginary portion 202. An amplitude 203 of the wavelet is marked as an envelope. The signals processed by the wavelet transformation, which as response signals in response to the first excitation via sweep pulse 101 are detected at the individual blades via laser vibrometry, are determined at a plurality of measuring points. The measuring points are situated at an upper tip of each blade. The measuring points are distributed in such a way that node diameter families previously ascertained by simulation may be detected.

Figure 3:
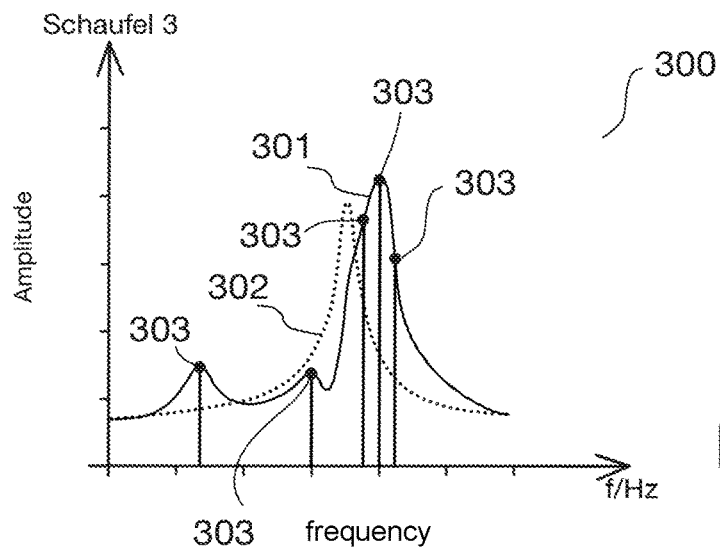
FIG. 3 shows a frequency response of a mechanical object.

FIG. 3 shows an amplitude response 300, i.e., an amplitude that is plotted as a function of a frequency. Amplitude response 301 represents the oscillation behavior of the third blade of the blade wheel at a rotational speed of 5000 revolutions/min, and exhibits resonance. This rotational speed is achieved during start-up of the blade wheel after a defined operating period, and represents a typical operating state in which the blade wheel operates. In addition to the amplitude response of the third blade of the blade wheel, an ideal amplitude response 302 at the rotational speed in question is illustrated. The mistuning now results, for example, from the difference in the ideal amplitude response from the amplitude response of the blade in question.

FIG. 3 also shows a selection of multiple frequencies 303, as supporting points, from the measured frequency-dependent range. The selected frequencies are illustrated by vertical lines, each of which ends with a round point on the measured curve. Accordingly, the supporting points are selected for the third blade for a rotational speed of 5000 revolutions/min. Additionally or alternatively, one or multiple supporting points may be selected for other rotational speeds. FIG. 3 shows only the selection of the supporting points for the third blade. In the present example, this step is carried out for all blades of the blade wheel in order to establish the differences between the individual blades with regard to the mechanical parameters, and thus the mistuning of the blade wheel with regard to a node family. In particular, enough supporting points are required for a blade so that the subsequently used equation system from which the mechanical parameters are ascertained is at least determined; i.e., an unambiguous solution is made possible. In the present case, these are two supporting points for each blade and for each node family. In particular, the same supporting points may be used for all blades. Alternatively, even more supporting points, in particular three, four, five, or ten, may be selected so that the equation system is overdetermined. An overdetermined equation system may be solved with respect to the mechanical parameter(s) via the least squares method, for example, in particular using the Moore-Penrose pseudoinverse.

Figure 4:
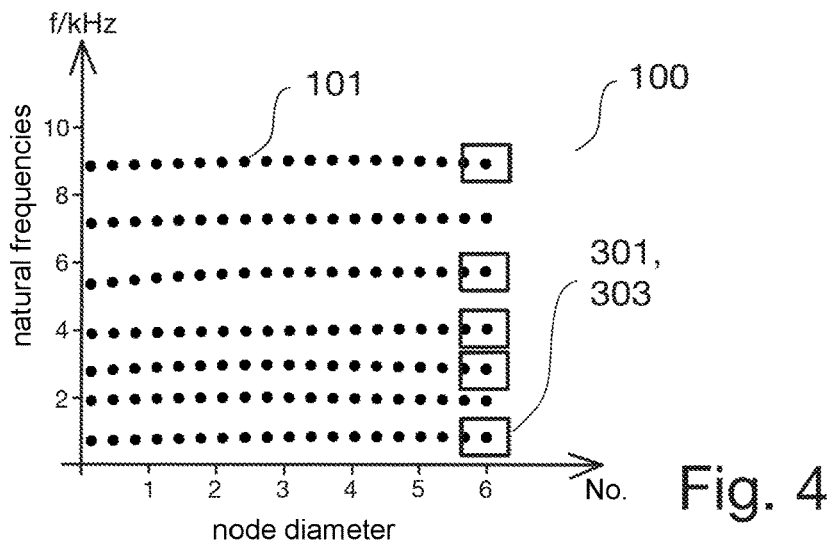
FIG. 4 shows a coupling diagram.

FIG. 4 shows coupling diagram 100 from FIG. 1. In addition, selected frequencies 303 are now depicted in FIG. 4 along the Y axis. These frequencies are situated in the bottom rectangle at the right edge of the diagram. FIG. 4 also shows yet further mode families that result from further resonances, not illustrated, which in particular may also be represented in each case by at least five supporting points. A second excitation of the integrated blade wheel is carried out at these frequencies. A single multifrequency signal is not used as with the first excitation; instead, the blade wheel or the blades is/are excited via individual monofrequency sinusoidal oscillations that include only the selected frequencies. The type of excitation and the experimental procedure remain the same as for the first excitation of the blade wheel.

Figure 5:
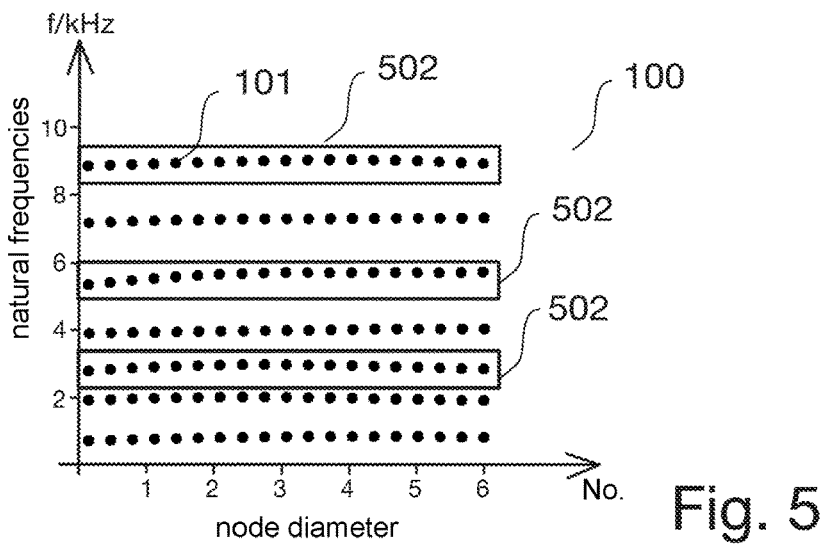
FIG. 5 shows a coupling diagram.

FIG. 5 likewise shows coupling diagram 100 from FIG. 1 or FIG. 4. After the blade wheel has been excited a second time at the selected frequencies via sinusoidal pulses, frequencies or frequency ranges are selected a second time. As shown in FIG. 5, these frequency ranges include individual node diameter families 502. Via the corresponding amplitudes or phases for the selected frequency ranges, a model may now be computed from which the correspondingly desired parameters, in this case the Lehr's damping factor, changes in stiffness, damping properties, and the excitation are determined. A so-called reduced-order code (ROC) may be used as the basis for the equation system.

Figure 6:
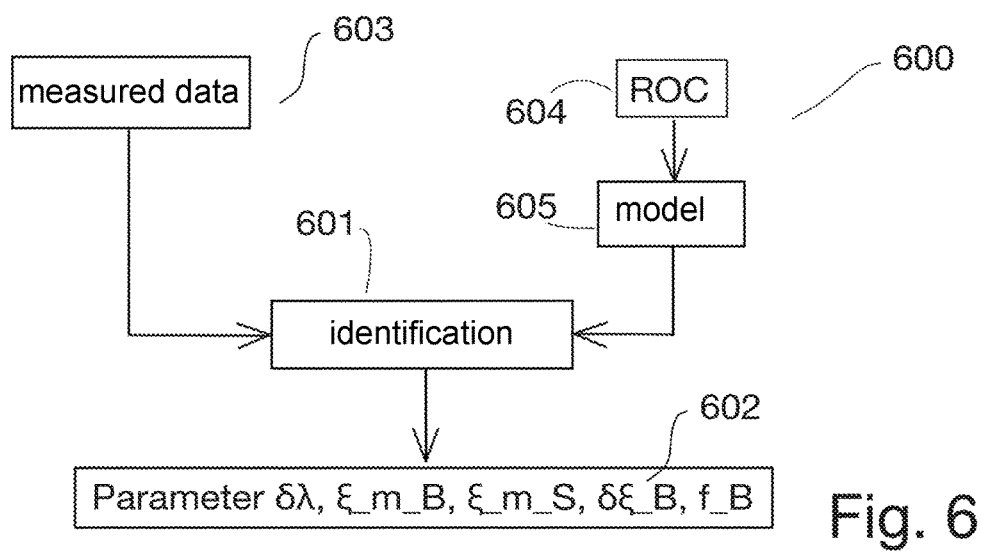
FIG. 6 shows a block diagram of a method according to one specific embodiment of the disclosure.

FIG. 6 shows an overview of the described method according to one specific embodiment. Identification 601 of various mechanical parameters 602 of a mechanical object is carried out with the aid of a model-based adaptation 605 of corresponding parameters with regard to experimentally ascertained information 603, and is computed with the aid of an ROC 604. Parameter $\delta\lambda$ represents a change in the stiffness of a blade, for example relative to an average value or relative to the stiffness of the preceding blade. Parameter $\xi$ represents a damping of a blade, for example according to Lehr's damping factor. Parameter $\xi\_m\_B$ represents the average damping of the blades. The parameter relates to the average damping of the disk $\xi\_m\_S$. Parameter $\delta\xi\_B$ indicates a deviation of the damping of a blade from $\xi\_m\_B$. Parameter $f\_B$ depicts the excitation for one blade or for each blade. A mistuning of the blade wheel may be comprehensively described using a set of parameters for each blade of the blade wheel.

The equation system thus includes the change in the stiffness of each blade. In addition, the equation system includes the damping properties of the disk and/or of the blades; the damping of each blade may be determined in particular separately and/or as an average value. The equation system also includes the excitation of the blades and/or of the disk corresponding to the excitation during measurement; the excitation may be applied to one or multiple blades, in particular each blade, and/or to the disk.

LIST OF REFERENCE NUMERALS

100 coupling diagram
101 spectrum of the sweep pulse
102 node diameter family
200 signal representation: Morlet wavelet
201 wavelet (real portion)
202 wavelet (imaginary portion)
203 wavelet amplitude
300 frequency-dependent range
301 measured amplitude response of the third blade
302 ideal amplitude response of the third blade
303 selected supporting points of the measured amplitude response
502 selected frequency ranges for model identification
600 measuring method
601 model identification or parameter identification
602 identified mechanical parameters
603 measured data
604 reduced-order model
605 mechanical model

What is claimed is:

1. A method for ascertaining at least one mechanical parameter of a mechanical object, the method comprising the steps of: providing a first excitation to the mechanical object via a multifrequency signal, the multifrequency signal being acoustic and a chirp signal or a sweep signal, a length of the sweep signal or of the chirp signal being shorter than a mechanical settling time of the mechanical object; detecting a first response signal of the mechanical object at at least one measuring point at the mechanical object; transforming the first response signal from a time range into a frequency-dependent range; selecting at least one frequency based on the frequency-dependent range; providing a second excitation of the mechanical object based on the selected at least one frequency; detecting a second response signal of the mechanical object at the at least one measuring point of the mechanical object; and
ascertaining a mechanical parameter based on the second response signal.

2. The method as recited in claim 1 wherein the mechanical object is a blade wheel.

3. The method as recited in claim 1 wherein the mechanical object is at least one blade of a blade wheel.

4. The method as recited in claim 2 wherein the blade wheel is an integrally manufactured blade wheel.

5. The method as recited in claim 1 wherein the frequency-dependent range into which the first response signal is transformed is a function of time, rotational speed, or position.

6. The method as recited in claim 5 wherein the transformation of the first response signal is carried out via a wavelet transformation or via a chirplet transformation.

7. The method as recited in claim 1 wherein the selection of the at least one frequency based on the frequency-dependent range maximizes a piece of information concerning an amplitude pattern or phase pattern over the frequency-dependent range.

8. The method as recited in claim 1 wherein the at least one frequency includes multiple frequencies selected in such a way that an equation system is determined or overdetermined with regard to the mechanical parameter.

9. The method as recited in claim 1 wherein the second excitation of the mechanical object takes place based on at least one sinusoidal excitation signal.

10. The method as recited in claim 1 wherein the ascertainment of the mechanical parameter includes selecting the second response signal.

11. A device for ascertaining at least one mechanical parameter of a mechanical object, and configured to: carry out a first excitation of the mechanical object using a multifrequency signal, the multifrequency signal being acoustic and a chirp signal or sweep signal, a length of the sweep signal or of the chirp signal is shorter than a mechanical settling time of the mechanical object; detect a first response signal of the mechanical object at at least one measuring point at the mechanical object; transform the first response signal from a time range into a frequency-dependent range; carry out a second excitation of the mechanical object based on selected frequencies; detect a second response signal of the mechanical object at the at least one measuring point of the mechanical object; and ascertain the mechanical parameter based on the second response signal; wherein the first excitation or the second excitation takes place via a plurality of speakers, each of which excites a portion of the mechanical object and a calibration of a sound level and of a phase takes place in succession for one or multiple speakers.

12. The device as recited in claim 11 wherein the mechanical object is supported by one or multiple springs having a predefined stiffness.

13. The device as recited in claim 11 wherein a portion of the mechanical object is one of multiple blades of a blade wheel.

14. The method as recited in claim 1 wherein the second excitation is provided via a further chirp or sweep signal.

* * * * *